US009883085B2

(12) United States Patent
Piednoir

(10) Patent No.: US 9,883,085 B2
(45) Date of Patent: Jan. 30, 2018

(54) MINIATURE ONBOARD CAMERA DEVICE FOR SPORT

(71) Applicant: Jean-Marc Piednoir, La Chapelle-Heulin (FR)

(72) Inventor: Jean-Marc Piednoir, La Chapelle-Heulin (FR)

( * ) Notice: Subject to any disclaimer, the term of this patent is extended or adjusted under 35 U.S.C. 154(b) by 150 days.

(21) Appl. No.: 14/890,673

(22) PCT Filed: May 12, 2014

(86) PCT No.: PCT/FR2014/051083
§ 371 (c)(1),
(2) Date: Nov. 12, 2015

(87) PCT Pub. No.: WO2014/184475
PCT Pub. Date: Nov. 20, 2014

(65) Prior Publication Data
US 2016/0119512 A1 Apr. 28, 2016

(30) Foreign Application Priority Data
May 14, 2013 (FR) ..................................... 13 01091

(51) Int. Cl.
*H04N 5/225* (2006.01)
*F16M 13/04* (2006.01)
*G03B 17/56* (2006.01)
*A42B 1/24* (2006.01)
*H04N 7/18* (2006.01)
*A42B 3/04* (2006.01)

(52) U.S. Cl.
CPC ............. *H04N 5/2252* (2013.01); *A42B 1/24* (2013.01); *F16M 13/04* (2013.01); *G03B 17/561* (2013.01); *H04N 5/2251* (2013.01); *H04N 7/183* (2013.01); *A42B 3/042* (2013.01)

(58) Field of Classification Search
None
See application file for complete search history.

(56) References Cited

U.S. PATENT DOCUMENTS 4,244,500 A * 1/1981 Fournier .................. A45F 5/00
224/201
5,752,276 A 5/1998 Baudou et al.
(Continued)

FOREIGN PATENT DOCUMENTS

FR 2793118 A1 11/2000
WO 9414349 A1 7/1994

*Primary Examiner* — W B Perkey
(74) *Attorney, Agent, or Firm* — Bachman & LaPointe, P.C.

(57) ABSTRACT

A miniature onboard camera device for sport. A miniature onboard camera device for hands-free filming of the view seen by the user. The device consists of a curved casing, formed from two wings that can be inclined around a central module, the assembly thus making it possible to conform to the shape of the support operating as an attachment and with no overhang. The central module comprises a tiltable ball joint incorporating the lens of the camera, making it possible to obtain the desired viewing angle. The device according to the invention is intended, in particular, to be positioned on helmets, protection visors or caps in order to safely film as close as possible to the action.

15 Claims, 14 Drawing Sheets

(56) References Cited

U.S. PATENT DOCUMENTS

| | | | | |
|---|---|---|---|---|
| 6,704,044 B1* | 3/2004 | Foster | ............ | A42B 1/24 |
| | | | | 348/157 |
| 7,621,681 B2* | 11/2009 | DeSorbo | ............ | G03B 17/563 |
| | | | | 224/270 |
| 9,360,682 B1* | 6/2016 | Edwards | ............ | G02C 11/10 |
| 2003/0071961 A1 | 4/2003 | Schubert | | |
| 2004/0008157 A1 | 1/2004 | Burbaker et al. | | |
| 2006/0072007 A1 | 4/2006 | Gilor | | |
| 2009/0307828 A1* | 12/2009 | Ludlow | ............ | A61F 9/029 |
| | | | | 2/431 |
| 2012/0050607 A1* | 3/2012 | Sims | ............ | G03B 17/02 |
| | | | | 348/373 |
| 2013/0004153 A1 | 1/2013 | McKee et al. | | |
| 2013/0033852 A1* | 2/2013 | Liao | ............ | A42B 1/24 |
| | | | | 362/106 |
| 2014/0009606 A1* | 1/2014 | Puccio | ............ | H04N 7/183 |
| | | | | 348/143 |
| 2015/0122849 A1* | 5/2015 | Jones | ............ | F16M 13/04 |
| | | | | 224/181 |
| 2015/0157078 A1* | 6/2015 | Kendis | ............ | A42B 1/24 |
| | | | | 24/3.12 |
| 2016/0360146 A1* | 12/2016 | Smith | ............ | H04N 5/772 |

* cited by examiner

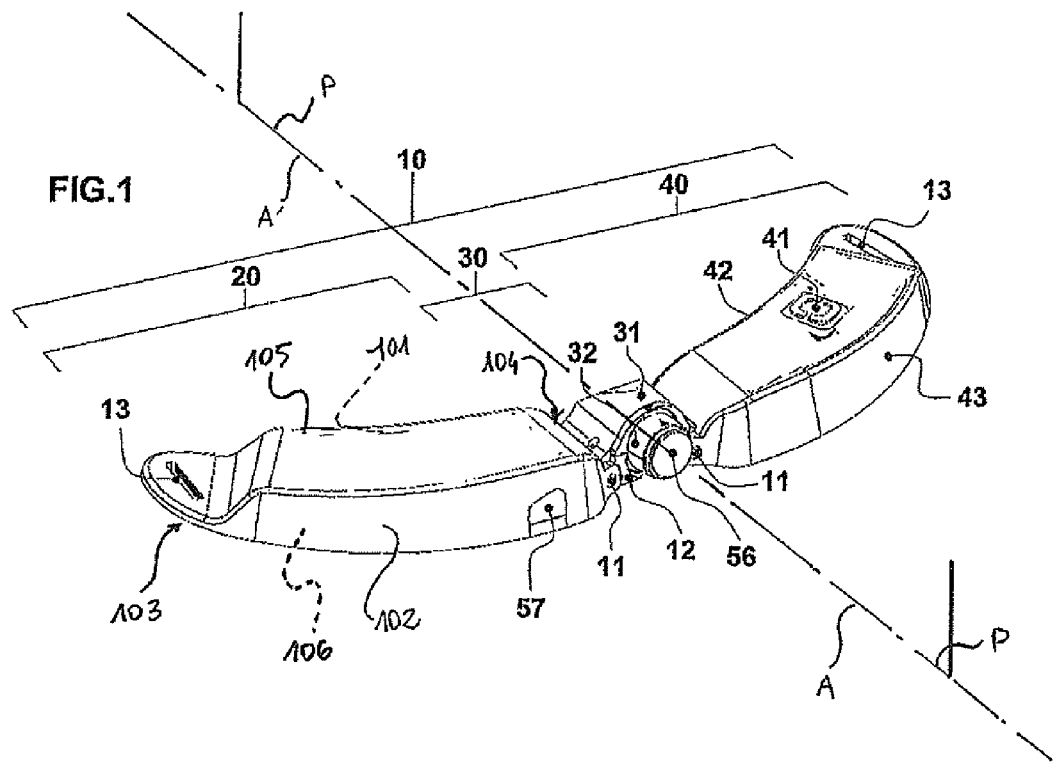

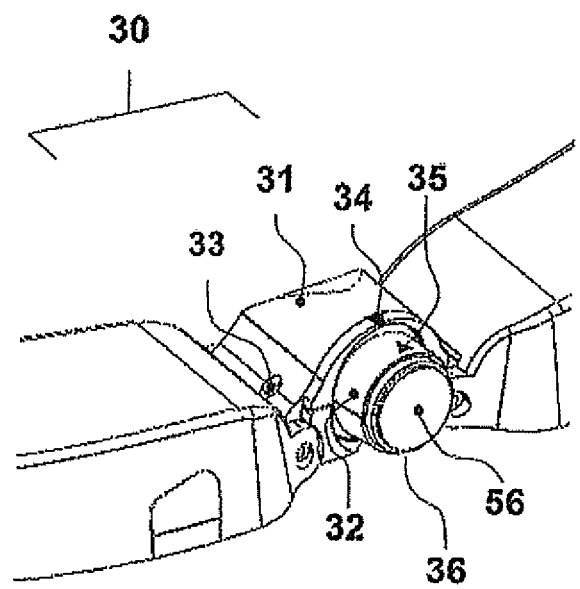
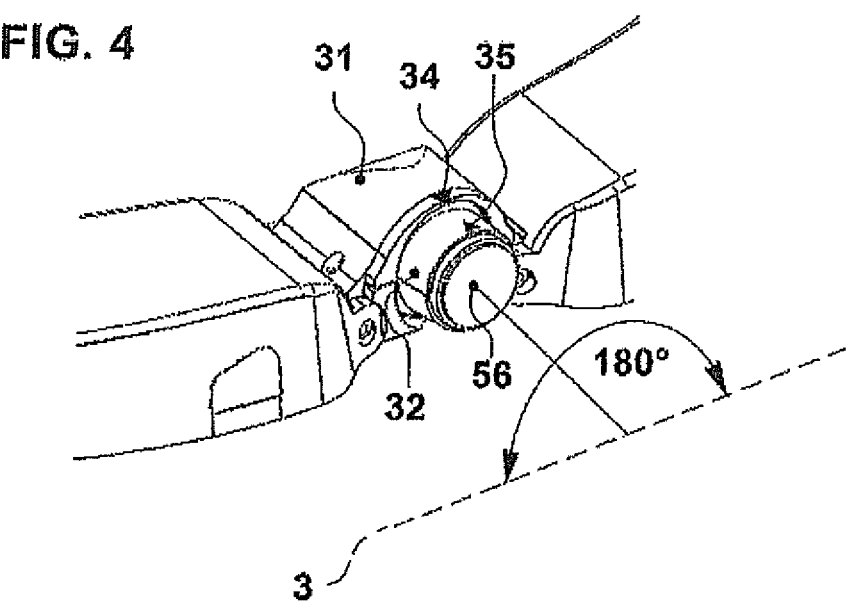

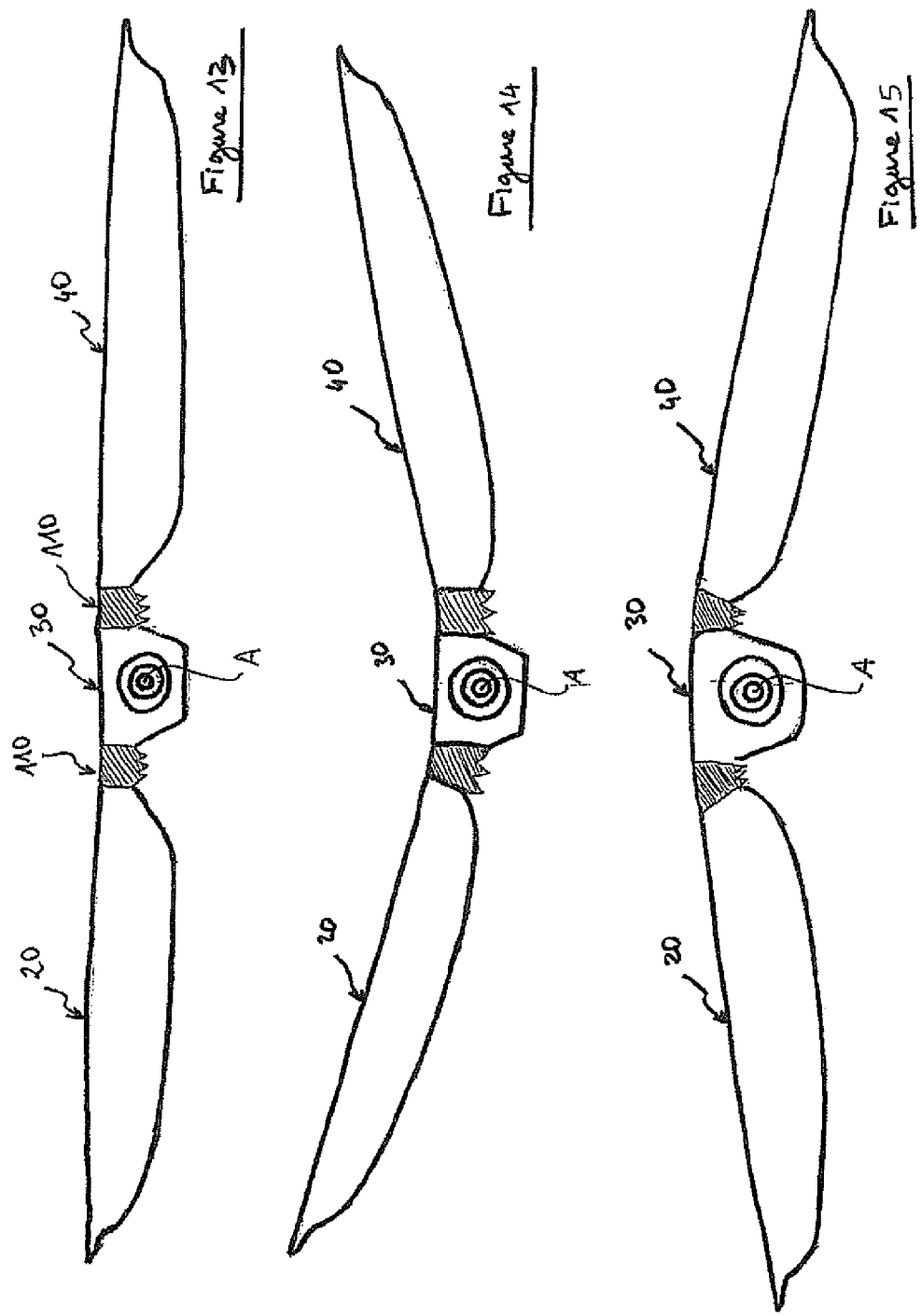

MINIATURE ONBOARD CAMERA DEVICE FOR SPORT

BACKGROUND

The present invention relates to a miniature onboard camera device enabling the user to film mainly sports scenes while having his/her hands free.

Currently, such images and videos are traditionally shot using a "box" type camera attached, strapped, fixed by means of a suction pad, or stuck on the protective helmet. This type of camera entails many risks of injury for their users and for the other persons, such as: the camera coming off, the trajectory deviating during a fall, the camera catching a third party object, the helmet being impacted during a fall. Considering such potential danger, many sports federations and helmet manufacturers prohibit adding any protrusion on helmets and specifically this type of cameras.

Besides, the current systems, such as those disclosed in the documents US2004/008157, US2006/0072007, US2013/0004153, do not make it possible to truly render the user's point of view, since the attachment mode and the dimensions thereof require them to be positioned on the top or the side of the helmet. Additionally, the box-type cameras are large and highly visible, which makes them unaesthetic and incompatible with some sports for which special outfits are imposed.

SUMMARY

The device of the invention aims at remedying such drawbacks.

For this purpose, the miniature onboard images and/or video capturing device comprises a module 30 containing a miniature images and/or video capturing system and at least one elongate casing with at least one wing 20, 40 accommodating operating equipment of the images and/or video capturing system, such as a battery and/or on-board electronics, with the module 30 and the casing 10 being hinged in pairs so as to be able to adopt a curved configuration included in a plane perpendicular to the optical axis of the images and/or video capturing system, and/or included in a plane containing the optical axis of the images and/or video capturing system so as to be able to conform to the matching curved shape of an accessory worn on a user's head or the user's forehead himself/herself, to be attached thereto in the curved configuration.

According to other characteristic features used independently or in combination:
the wing is positioned on one side of the optical axis of the optical system.
the casing 10 comprises two wings 20, 40, with each one being hinged with respect to a side edge of the module 30, with the two wings being respectively arranged on either side of the optical axis of the images and/or video capturing system.
the joint of a wing relative to the module is provided by a flexible portion inserted between the module and the wing and secured to the module and to the wing.
the joint of a wing relative to the module is provided by a mechanical link of the pivot or ball joint type.
the device comprises means for fastening to the accessory or onto a user's forehead.
the fastening means are positioned on the lower face and/or on the upper face and/or on the rear face thereof, preferably in the form of a hook-and-loop strip liable to cooperate with a matching hook-and-loop strip of the user's accessory and/or an adhesive to be attached to the accessory or directly to the user's skin.
the wing is in the shape of a closed shell and contains a microphone, with the shell protecting the microphone from unwanted sounds such as those created by the wind when the user moves at high speed.
the images and/or video capturing system comprises a steerable ball joint enabling a lens of the capturing system to rotate about a horizontal axis and/or about a vertical axis.
the device comprises means for locking the ball joint in a particular position.
the device comprises a single control button protruding on the capturing system providing all the on, pause and off functions.
the device comprises an indicator light indicating the on or off state of the capturing system, arranged on the lower face of the wing opposite the capturing system in order to be visible to the user without requiring him/her to remove the device, while not excessively obstructing his/her field of view.

The invention also relates to an accessory with a miniature onboard camera intended to be worn on the user's head, comprising a part forming a headband liable to conform to the rounded shape of the user's head. According to the invention, the accessory device comprises the above device and means for fastening between the headband and the device.

Preferably, the device is fixed by its rear face, on the front face of the headband.

According to one characteristic, the accessory comprises a visor integral with the headband, with the device being attached by its lower face or by its upper face respectively on the upper wall or the lower wall of the visor.

More precisely, the previously defined device has indeed according to a first characteristic, a curved horizontal casing which makes it possible to match the shape of a helmet or of the user's forehead and to attach such device to the front of the helmet, either by surface mounting or by thickness mounting or still on or under the protection visor. The miniature onboard camera device for sports is characterized in that it comprises a curved casing making it possible to match the shape of a helmet or a user's forehead, and consists of at least one wing which may be tilted around a module containing the lens of the camera. Thanks to this new position, the device is centered and as close as possible to the user's eyes to capture pictures, sound and even more realistic videos.

The device provides new opportunities for integration and allows safe use thereof by the user thanks to its integration without overhang and the fact that the protective helmet integrity is not affected in case of impact. Thus, the device can be integrated inside a helmet, in the thickness thereof, between the protective glass and the user's forehead. It may also be positioned under or on a protective glass, with the latter being jettisonable in case of a crash impact since it is not secured to the helmet proper.

Thanks to its location and its design, the device is a discreet onboard camera system hardly visible from the outside. Thanks to its light weight, the device can also be attached to the visor of a cap or to a spectacle frame.

According to a first embodiment:
The shape of the device may be curved in the direction of the width and of the height so as to conform to the shape of a helmet, a protection visor, a cap or the user's forehead.

The length and the shape of the device are so designed as not to go beyond the helmet or the protection visor to prevent any snagging.

The device may consist of a central part with a joint system making it possible to steer the two wings attached on either side so as to conform to the shape of the fastening support as best as possible.

The casing may comprise a rim for the abutment of the steerable wings.

The device may integrate two wings, a left one and a right one, more compact than the central part so that the user's field of view remains clear and unobstructed.

The wings are thinner at their ends in order to be inserted into a slot so as to introduce an additional fastening system such as a strap, a clip, an additional bolted part.

The device consists of an upper portion having a domed shape and a lower portion having a flat bottom shape which makes it possible to stick a fastening system of the Velcro™, magnetic strip or self-adhesive pad types.

Preferably, the device is removably attached to its support mainly for security reasons enabling a rapid release in case of an impact or upon user's action. Similarly, such quick release makes it easier to read or to transfer the images or the videos and makes it possible to easily install the camera on various supports, such as to move it from a cap to a riding hat.

The device may include a camera lens focused between the eyes and above, so as not to obstruct the field of view while providing images as close as possible to what the user sees.

The camera lens may integrate a ball-joint rotating system to tilt on the vertical or horizontal axis, thus making it possible to use it, whatever the angle or the direction of use of the casing.

The central portion of the device includes a shell allowing the ball joint rotational movement with maximum inclination stops. It is also provided with a clamping system which makes it possible to lock the lens in the desired position.

BRIEF DESCRIPTION OF THE DRAWINGS

Other characteristics and advantages of the invention will be better understood from reading the following description of exemplary embodiments, made with reference to the appended drawings, wherein:

FIG. 1 shows a perspective view of a miniature camera assembly according to the invention.

FIG. 2 shows a front top view of the assembly shown in FIG. 1.

FIG. 3 shows a detailed view of the central module shown in FIG. 1.

FIG. 4 shows the camera lens rotating system according to the invention.

FIGS. 13 to 15 show an alternative embodiment of the ball joint of the wings of the device relative to the central module.

FIGS. 13 to 22 also show non-restrictive examples of use of the device according to the invention.

DETAILED DESCRIPTION

Referring to these drawings, the device comprises a casing 10 comprising two wings 20 and 40 positioned on either side of the central module 30. The device is curved in width, length and height in order to be able to conform to the shape of a helmet, a protection visor, a cap or the user's forehead. The device consists of two wings 20 and 40 more compact than the central module 30 so that the user's viewing angle 1 can remain clear as much as possible.

In the rest position as shown in FIG. 1, in which the wings and the central module are aligned, as seen in a front view (FIG. 2), the device is symmetrical relative to a P plane passing vertically through the central module 30 (which is seen from underneath).

The central module 30 is a small substantially rectangular box, a front panel of which is open to accommodate a miniature image and/or video capturing system, the lens of which will protrude from the front face of the module. It is provided with a cavity liable to accommodate a ball joint incorporating a lens of the image and/or video capturing system.

The ball joint is movable inside the cavity about a horizontal axis parallel to the P plane of symmetry, on a 180° arc (FIG. 4) to enable the attachment of the device above or below the visor of a cap, for example, without having to rotate the images and/or video during playback.

Figure 5A:
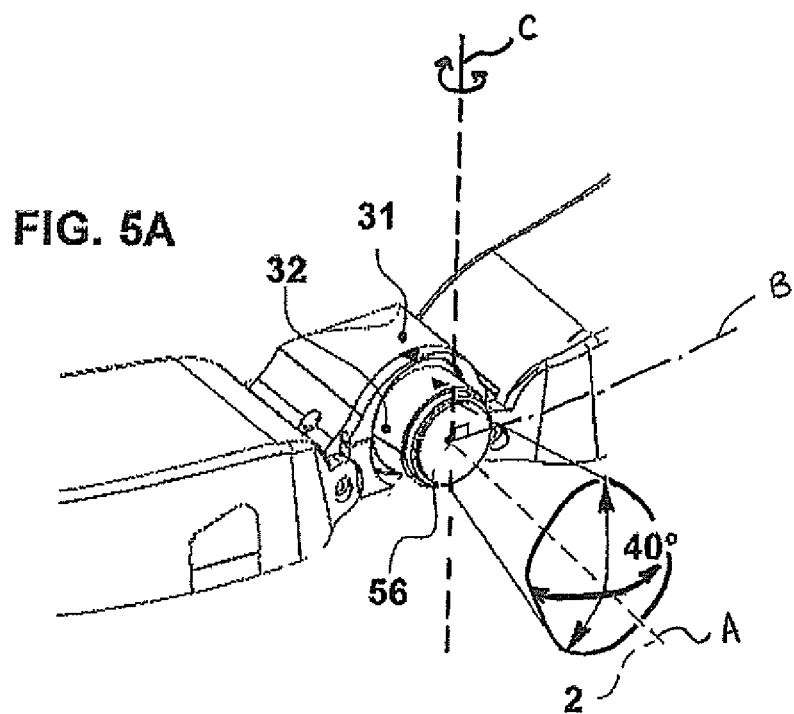
FIGS. 5A and 5B show the camera lens tilting system according to the invention.
Figure 5B:
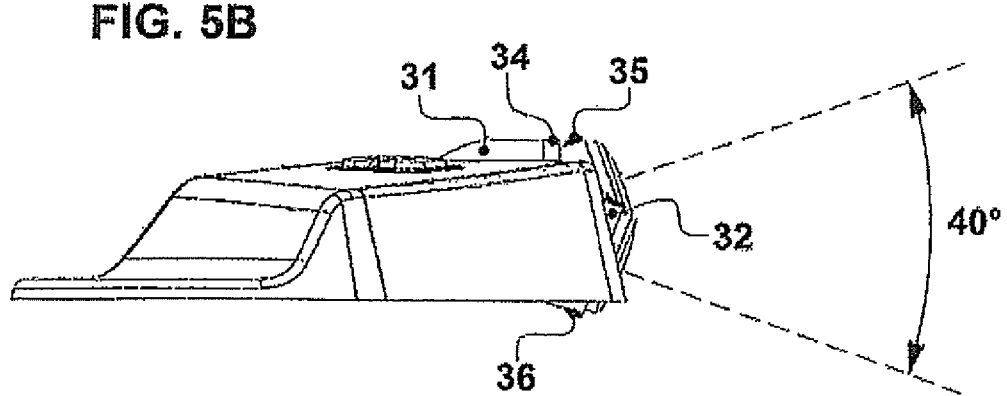
Figure 6:
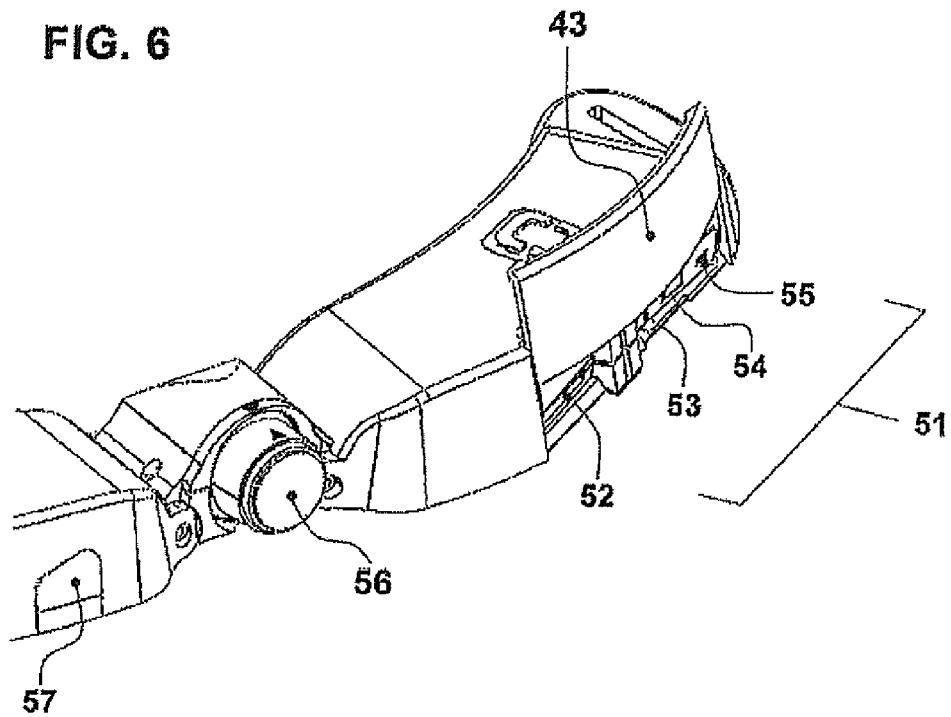
FIG. 6 shows the open sliding cover as shown in FIG. 1.

According to FIGS. 5A and 5B, the ball joint is also movable around a B axis perpendicular to the plane of symmetry so as to be adjusted upwards, and around a C vertical axis so as to be adjusted from left to right. With these degrees of freedom, the ball joint lens can see its optical axis move within a 40° opening cone for example.

It can be fixed in a particular position using various means: the module casing can be provided with a removable central shell and a clamping device 33 for applying a clamping force onto the ball joint 32 through the shell 31 or be equipped, on its outer face, with spikes that will engage between two matching ribs arranged in the internal cavity of the module, or a toothed wheel allowing it to adopt discrete positions, with such two solutions being advantageous in that they make it possible to position the ball joint when the device is carried by the user.

As the wings 20 and 40 are identical, only one will be described below, with such description being valid for the second wing.

Figure 7:
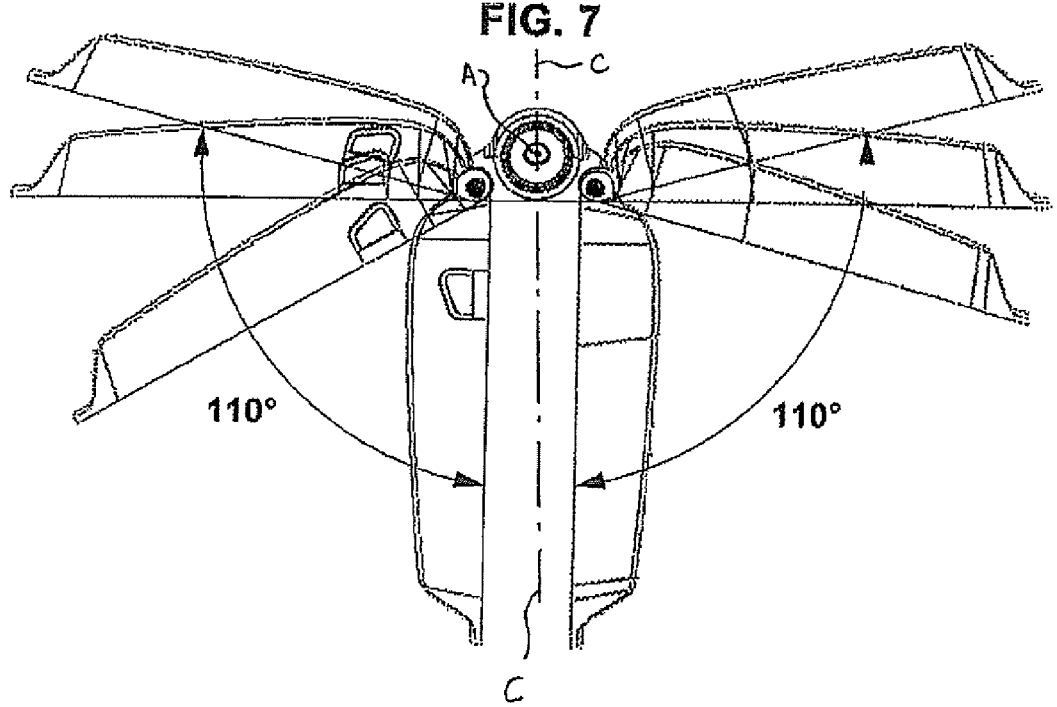
FIG. 7 shows the motion of the wings around the central module as shown in FIG. 1.

According to FIG. 1, each wing 20, 40 consists of a substantially parallelepiped block, curved in a circular arc so as to define a curved rear face 101 intended to conform to the curvature of the user's forehead, a front face 102 also curved, a relatively flat upper surface 106 as seen in FIG. 2, and a lower surface 105 slightly curved outwards at its center (see FIG. 2) so as to define, at the end 104 designed to be closest to the central module 30, a thinned shape enhancing the wing pivoting latitude relative to the module 30, which can travel as shown in FIG. 7, on an angular portion of at least 110°.

When both wings are raised above the module 30 as seen in FIG. 7, the domed shape also makes it possible to define a rounded contour for the device, which facilitates and makes more comfortable the handling thereof.

The material of the block forming the wing can be provided to allow the flexible deformation along the X, Y and Z axes which makes it possible to conform to the various forms of supports such as visors, helmets or users' foreheads.

Each wing 20 and 40 can rotate about the central module 30 thanks to a joint system 11 limited by the central box rim 12 used for the abutment. Such hinges 11 enable the wings 20 and 40 of the device to conform to the shape of the mounting bracket such as a helmet rim, a protection visor or a cap. According to FIG. 7, the wings 20 and 40 can be folded vertically to be used as a handle, thus making it possible to hold the device with a single hand.

In the example shown in FIGS. 1 to 7, a wing is hinged with respect to the corresponding edge of the central module 30 about a pivot axis 11 parallel to the plane of symmetry of the device through a conventional hinge (a rod extending through a fork formed at the ends of the wings and the corresponding edge of the module inserted between the two branches of the fork).

According to the embodiment shown in FIGS. 13 to 15, the hinge is provided by means of a flexible material portion 110 inserted between each wing 20, 40 and the central module 30, which provides greater flexibility for pivoting a wing relative to the central module 30, possibly about an axis different from the axis 11.

Figure 18:
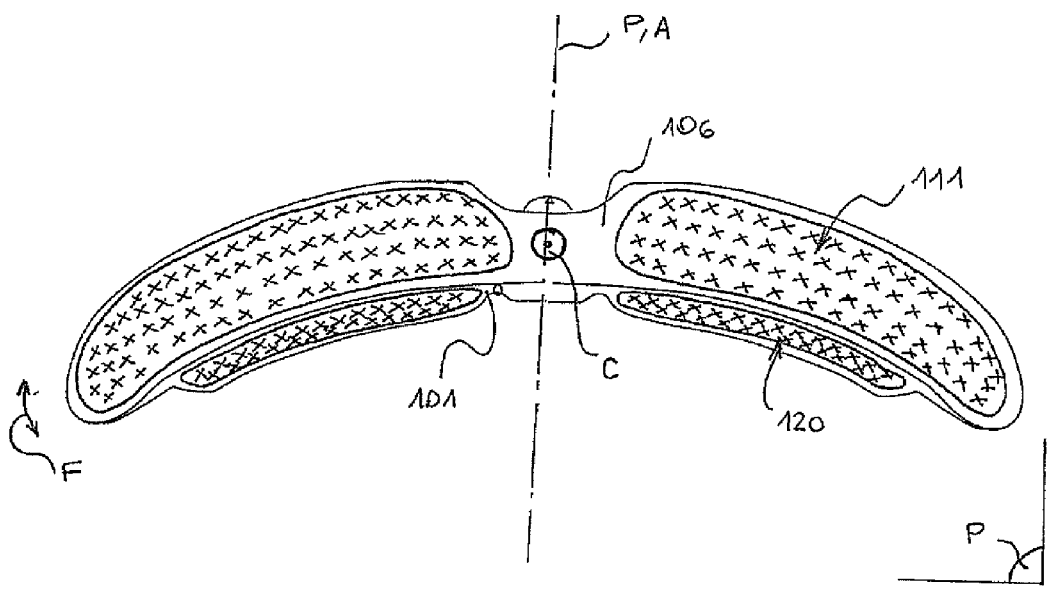
FIG. 18 shows the device according to the invention in perspective and highlights two fastening means arranged on the upper face and the rear face of the device.

As a matter of fact, such hinge can be provided by various means ensuring the pivoting of a wing with respect to the module in different directions, so as to form an assembly which matches the curved shape of a user's forehead (the device is then curved around a C vertical axis of curvature perpendicular to the optical axis, in both directions indicated by the F arrow in FIG. 18 and may thus adopt different curved configurations to best apply along the user's forehead) and/or the curved shape of a visor of a cap or the inner rim of a helmet (the device is then bent along a horizontal axis of curvature coinciding with the A optical axis between different curved configurations shown in FIGS. 13 to 15 (also refer to FIG. 7).

Figure 10A:
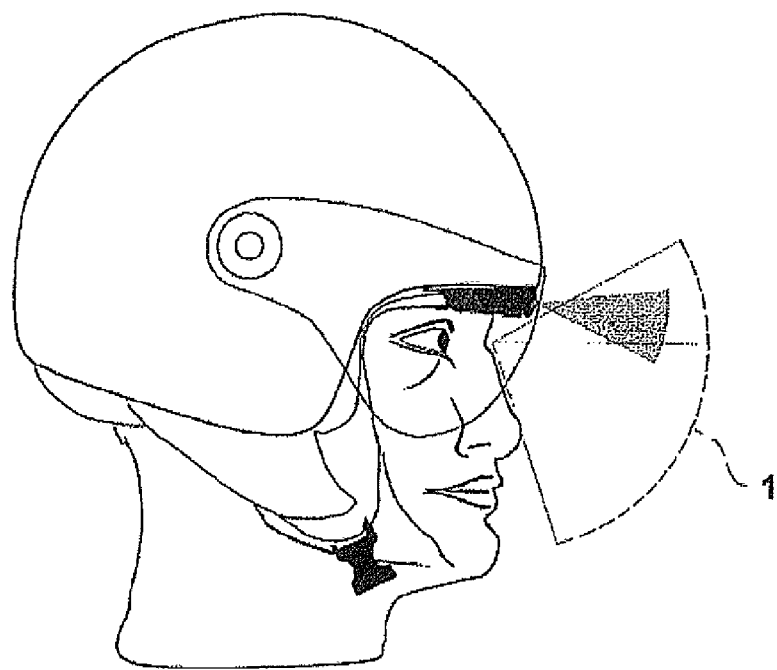
Figure 10B:
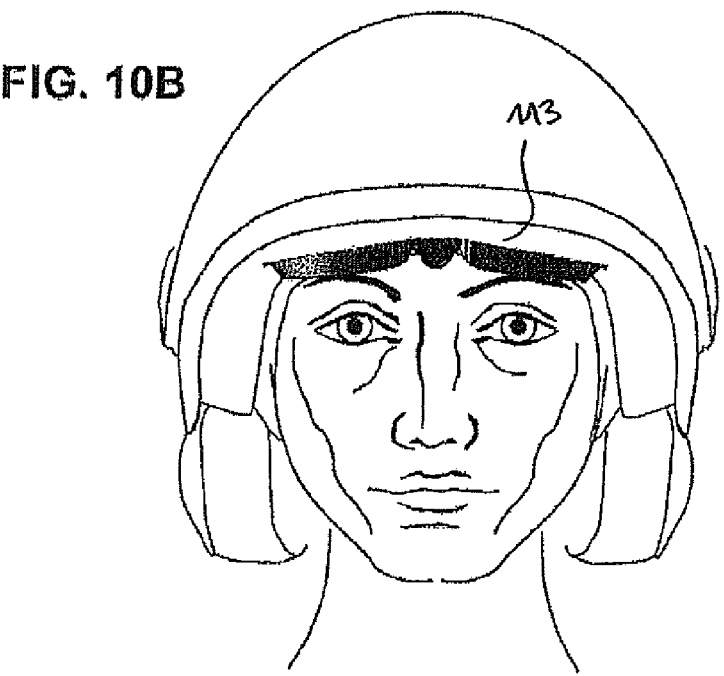
Figure 11A:
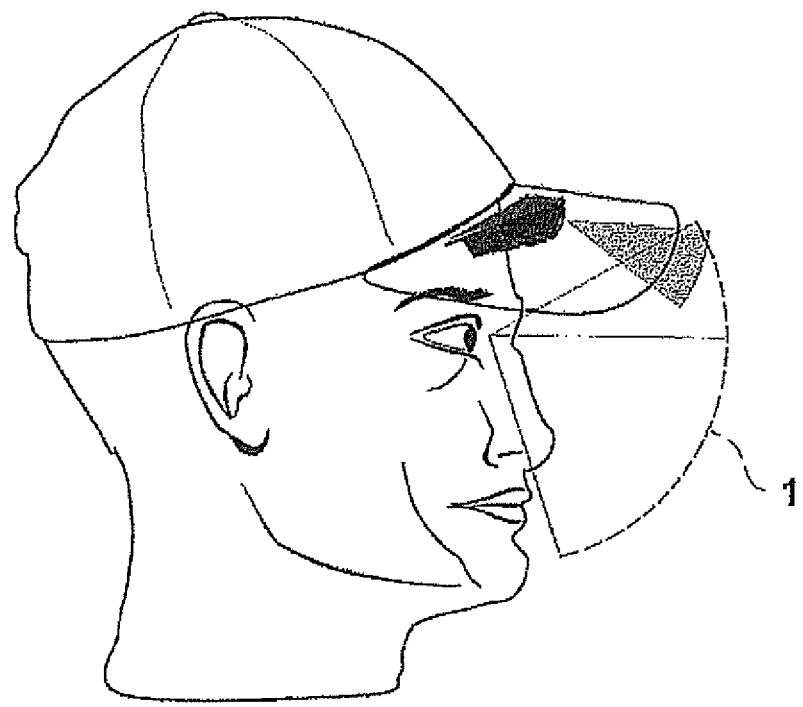
Figure 11B:
Figure 12A:
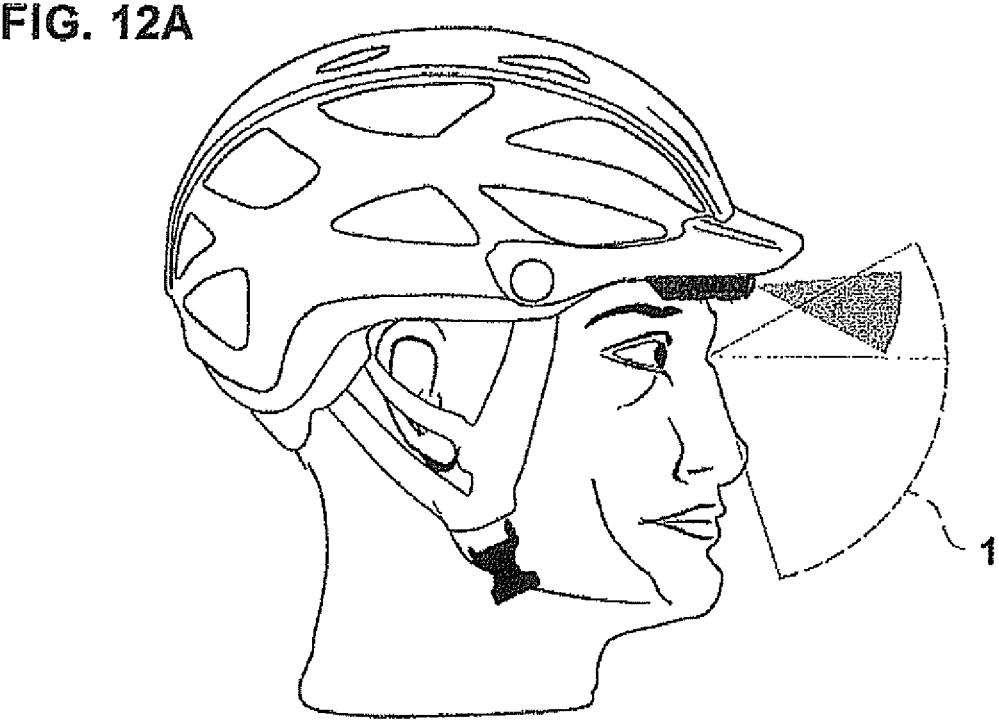
Figure 12B:
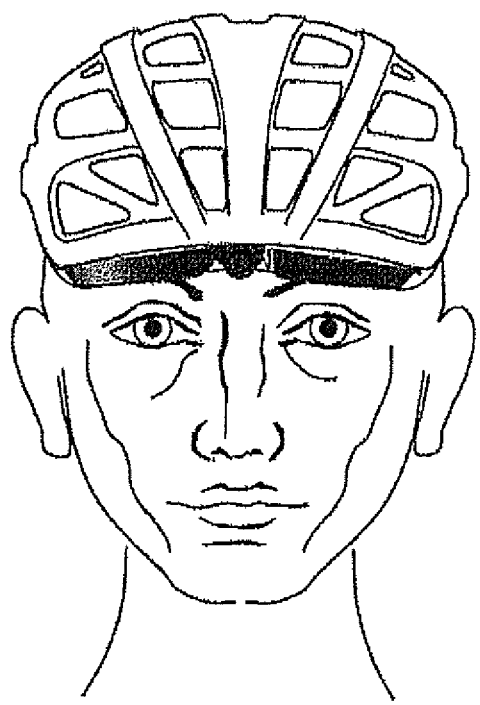

According to FIG. 1, the device comprises means for fastening 111 the wings 20, 40 on the inner or outer face of the visor of a cap or a helmet (FIGS. 8A, 9A, 11A, 12A, 17) or on the inner rim 113 of a helmet (refer to FIG. 10B).

In this case, the fastening means 111 is provided on the upper face 106 of the device.

Figure 8A:
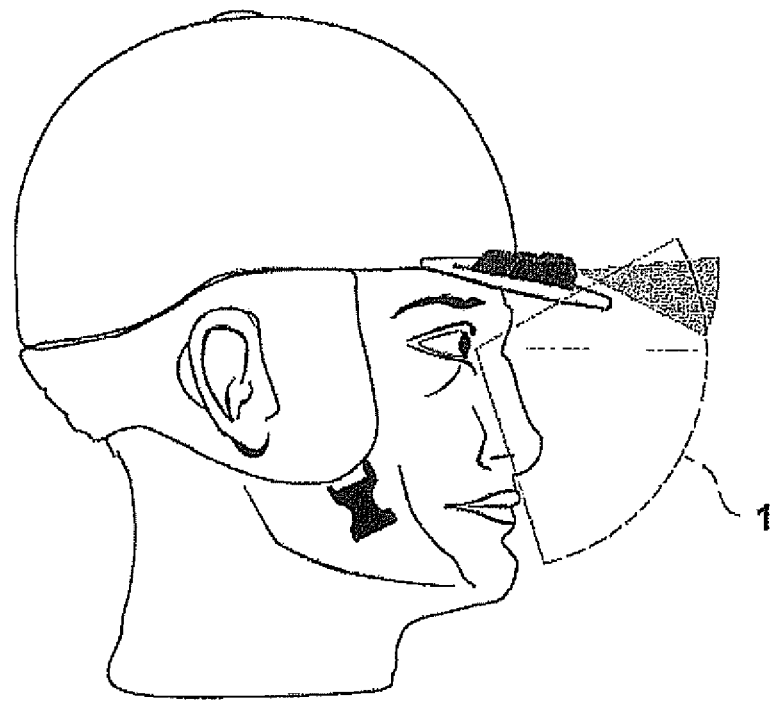
FIGS. 8A, 8B, 9A, 9B, 10A, 10B, 11A, 11B, 12A, 12B are non-restrictive examples of use of the device according to the invention.
Figure 8B:
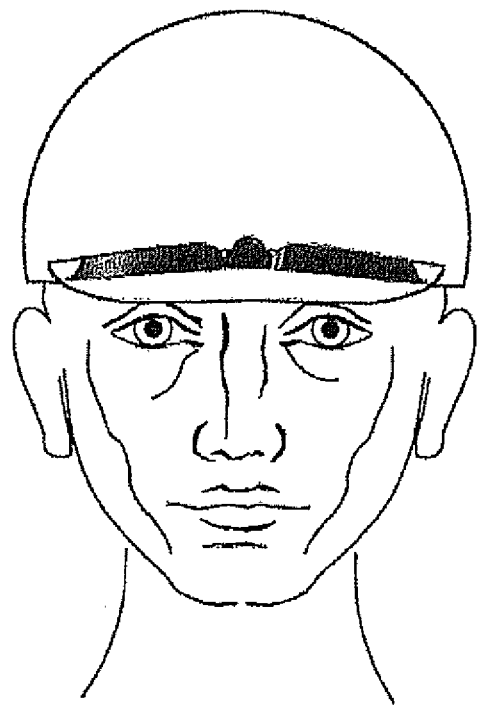
Figure 9A:
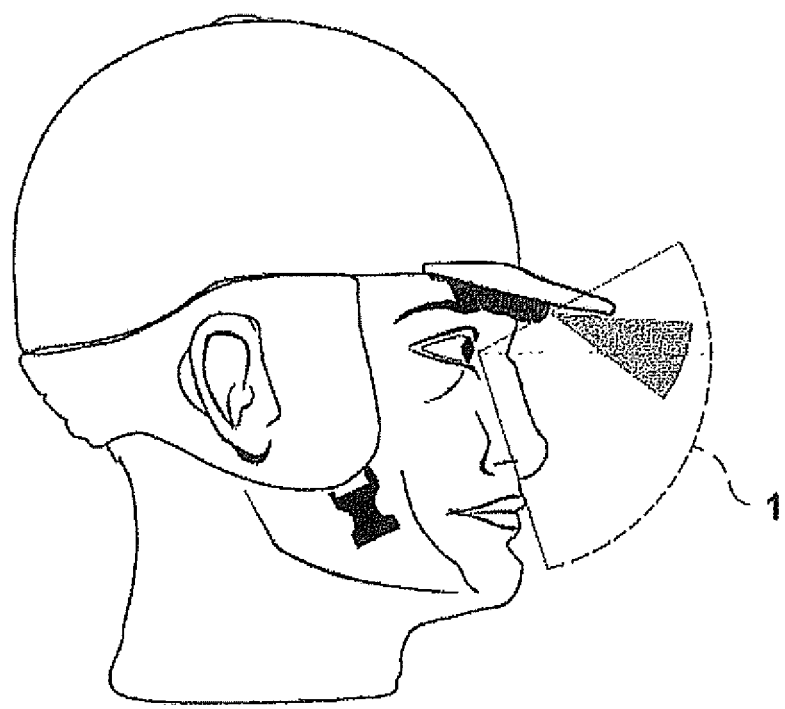
Figure 9B:
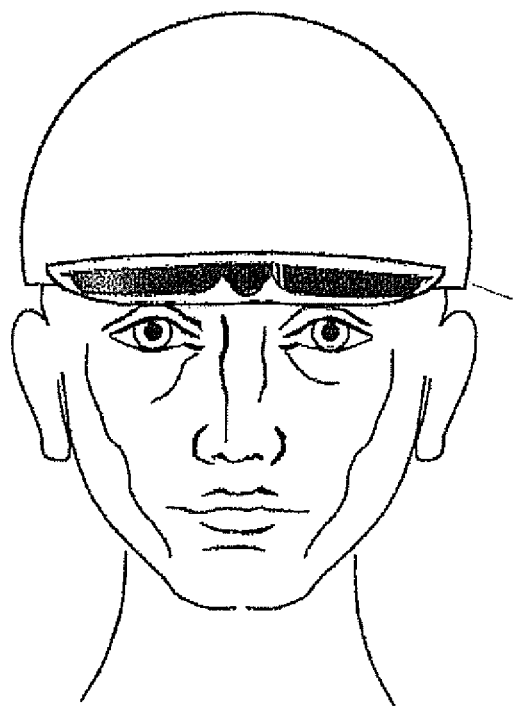
Figure 16:
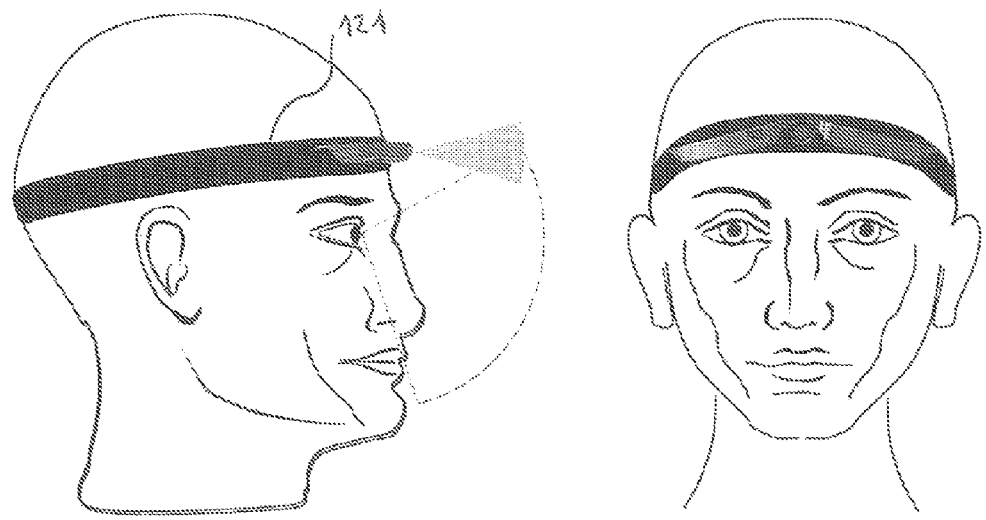
FIGS. 16, 17, 19, 20 illustrate various types of accessories which the device, according to the invention, may be fastened to (respectively a headband, a riding hat with a jockey's cap, a horse bridle and a ski or a motorcycle helmet).
Figure 20:
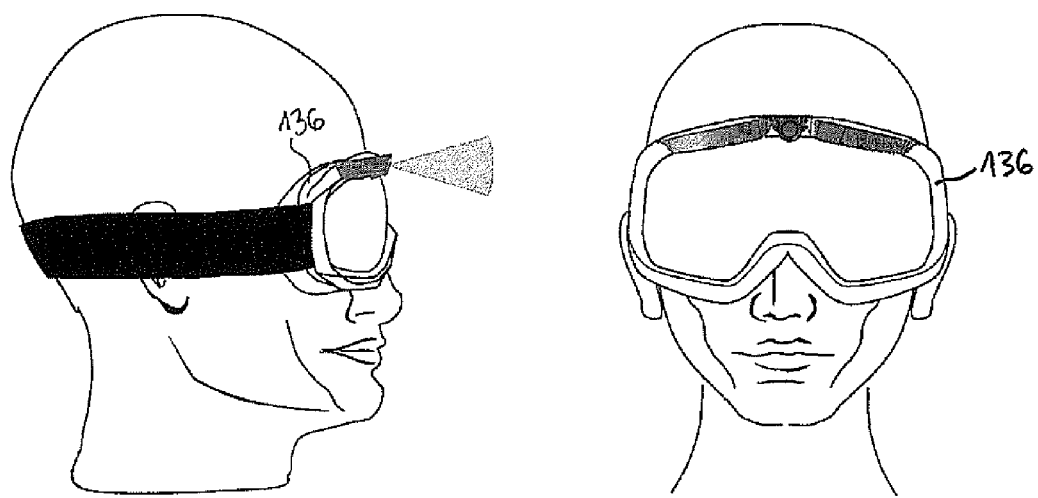

According to FIG. 18, the device may comprise fastening means 120 positioned on the rear face 101 of each wing, so as to be fixed on the outer face of an accessory having no visor such as a headband 121 (refer to FIG. 16) or a diving mask, skydiving or ski 136 goggles as illustrated in FIG. 20, on a bonnet worn by the user, or still on the outer surface of the domed portion of a cap when the device is fixed above the visor (FIG. 8A, 8B), or still, directly on the user's skin.

Figure 17:
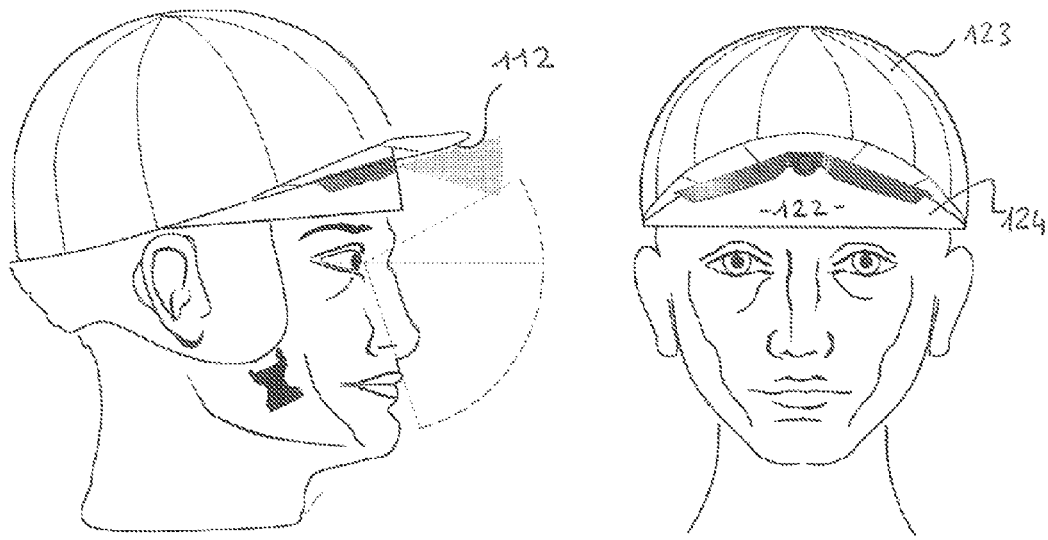

The embodiment shown in FIG. 17 illustrates a user wearing a riding hat 122 with a cap 123 formed of a piece of bonnet-shaped fabric topped with a visor made of fine cardboard material. This special constitution of the visor in a less rigid material than the one equipping a conventional riding hat, makes it possible, in case of a fall or an incident, to reduce the risk of injury for the user during more extreme practices. The two fastening means 111 and 120 fixed on the upper face 106 and the rear face 101 of the device are respectively fixed on the inner face 112 of the visor of the cap 123 and on the front face 124 of the riding hat 122. The light weight and the small dimensions of the device according to the invention make it possible to fasten it to a visor of such type, which is less rigid than the visors of conventional riding hats.

Such fastening means make it possible to lock the curved configuration of the wings and of the module.

They may be in the form of an adhesive strip covered with a protective film that enables a direct adhesion against the inner face 112 of the visor or against the user's forehead.

Or they may be a hook-and-loop strip cooperating with a matching hook-and-loop strip to be fastened onto the user's accessory, for example using an adhesive.

The ends of the wings 20 and 40 may be thinned so as to be inserted into a slot 13 for introducing therein an additional fastening system such as a strap, a clip, an additional bolted part.

However, the very light weight of the device, of about grams, reduces the risk of tearing the main fastening means even in extreme sports. Straps are thus optional. The casing 10 consists of a domed upper part and a flat bottom to facilitate the fastening of the device onto the mounting bracket.

The casing 10 contains, in each of the wings 20 and 40 respectively, the battery and on-board electronics 51.

The central module 30 integrates the image and video capturing device through a lens 56 integrated in a ball joint 32 enabling a defined and limited inclination on a C vertical or B horizontal axis. The lens rotating system 56 makes it possible to use the camera in every direction, by pivoting it on the B horizontal axis in order to obtain an image or video the right way up. The lens rotating system 56 on the B vertical axis makes it possible to precisely adjust the image or video camera angle.

The adjustment of tilt and rotation of the shooting is facilitated by the webcam function which makes it possible to view the video rendering in real time on the screen of an external device through a cord connected to the video jack 54 of the camera casing 10.

Adjusting the zero position is facilitated by a notch 34 used as a reference mark on the central shell 31 and by a top 35 and a bottom 36 mark positioned on the ball joint 32.

The center shell 31 fits into the central box 12 to hold the ball joint 32. A clamping device 33 makes it possible to lock the ball joint 32 and the lens 56 in a precise position in order to obtain images or videos with the good desired angle.

The casing 10 contains a small transparent face 57 making it possible to receive a radio or infrared signal used to control the basic functions of the device.

The casing comprises a button 41 connected by a joint to the wing 40 which actuates the switch of the electronic card for controlling the essential functions of the device. This button 41 is slightly protruding relative to the casing 40, which enables the user to find it easily even when wearing gloves.

The button may otherwise be in the form of a membrane which actuates the switch of the electronic card.

This single button provides all the ON, pause and OFF functions according to the various times a pressure is applied thereon by the user.

The casing is also provided with a spot for an indicator 42 enabling the user to visualize it without his/her field of view being disturbed, as it indicates the status of the device: on, off, video capture in progress.

The onboard electronics system is provided with a place for the memory card 52 for storing images, video and audio on a miniature memory card.

The device may be connected to another device or a computer via a socket 54, of the USB or any other type, which makes it possible to recharge the battery, download the contents of the memory card or to control the shooting angle of the device on an external screen using the webcam function.

In the closed position, the sliding shutter 43 protects the onboard electronics 51 and conforms to the original design of the casing 10. It also makes it possible to reduce the speed-associated sounds when capturing audio by protecting the audio capturing device 53. Other hinge means for the shutter on the rest of the wing may of course be provided, for example, a flap pivoting about an axis coinciding with the longitudinal edge of the wing.

When open, it provides easy access to onboard electronic functions: memory card 52, connection 54 reset button 55.

According to an alternative embodiment not shown, the device may also be equipped with a remote control for controlling the main functions of the device.

Figure 21:
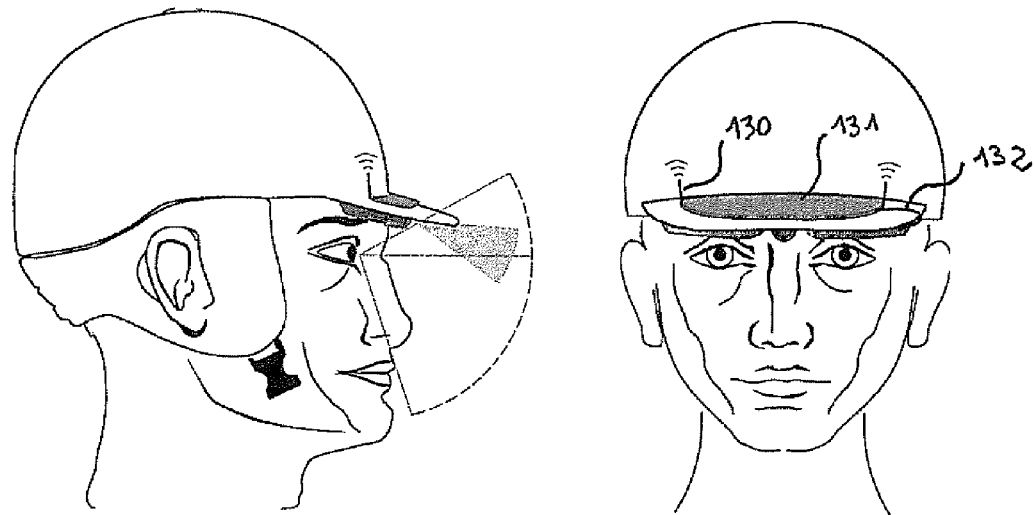
FIGS. 21 and 22 show the use of the device according to the invention respectively with an element for the remote transmission of the information collected, and with a sun sensor.

According to an alternative embodiment illustrated in FIG. 21, the device may also comprise a relay 131 mounted on the visor opposite the image capturing device, and making it possible to send, in real time, using radio waves 130 over a long-range frequency, the onboard images to a receiving station such as a computer or a tablet, with the relay being connected for example by a wire 132 to the device.

Figure 22:
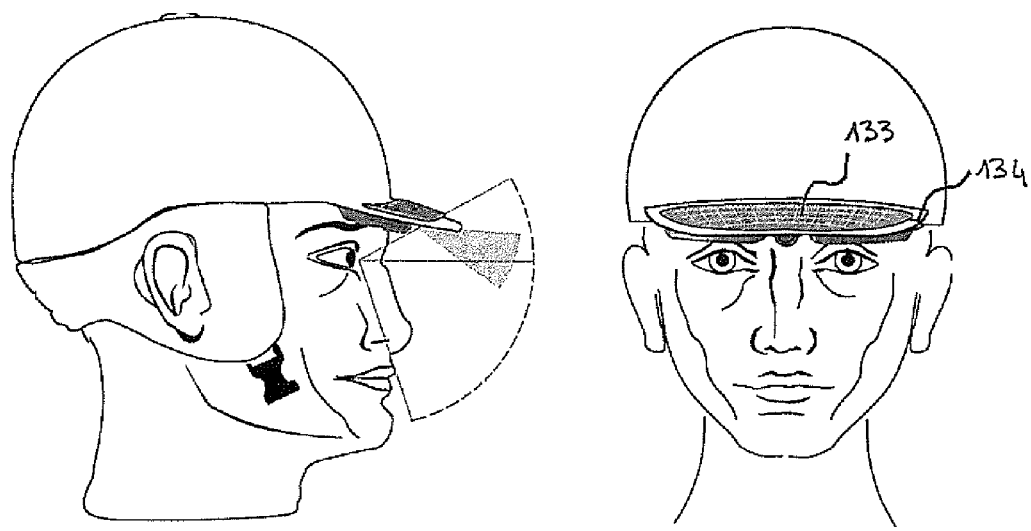

According to an alternative embodiment illustrated in FIG. 22, the device may also comprise a solar charger 133 with a view to extending the battery life of the integrated battery. The solar charger accessory 133 is attached to the top of the visor and connected to the device by a wire 134 with a view to continuously regenerating the battery charge. By way of non-restrictive example, the casing 10 will have dimensions of about 6.5 cm in width, 16.5 cm in length and 1.5 cm in height.

The device of the invention is more particularly intended to be positioned on helmets, protective visors, goggles, headbands, riding bridles or caps making it possible to shoot mainly sports scenes as close to the action as possible.

It may also be fixed by the fastening means directly to any part of a user's body, such as his/her forehead, neck, including the skin. In this case a dermatologically acceptable or non-allergenic adhesive is provided.

Figure 19:
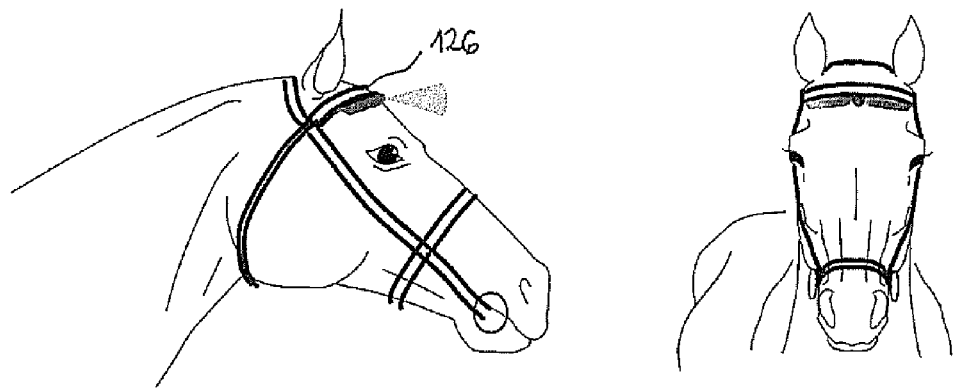

It can also be fastened to the bridle 126 of an animal such as a horse, for example above the eyes, as shown in FIG. 19. Thus, the term "user" should be understood as including both humans and animals. The possibility to modify the curvature of the device along a C vertical axis thus becomes particularly relevant to make it adaptable to the shapes of users' foreheads of different types. A joint or a ball joint of the flexible type for the rotation about that C axis is then to be preferred.

The fact that the device comprises a joint between each wing and the central module enables it to conform to the domed shape of an accessory or of the user's forehead, i.e. along the matching surface on the whole length of the device, without deviating by more than 10 mm for example. The fact that this joint can be rotated about different axes (e.g. about an axis parallel to the optical axis and about an axis perpendicular thereto) enables the device to adapt to different forehead shapes, accessories, or body parts of the user. Its flat shape when seen from the optical axis makes it discreet and virtually invisible when worn under a visor.

The invention claimed is:

1. A miniature onboard image and/or video capturing camera comprising:
a module containing a miniature image and/or video capturing system and at least one elongate casing provided with at least one wing accommodating operating equipment of the image and/or video capturing system, a battery and/or on-board electronics, wherein the module and the casing being hinged so as to adopt a curved configuration included in a plane perpendicular to the optical axis of the image and/or video capturing system, and/or included in a plane containing the optical axis of the image and/or video capturing system configured to conform to at least one of a curved shape of an accessory worn on a user's head and the user's forehead, and configured to be attached thereto in the curved configuration.

2. The device according to claim 1, wherein the wing is positioned on one side of the optical axis of the optical system.

3. The device according to claim 1, wherein the casing comprises two wings, with each one being hinged with respect to a side edge of the module, with the two wings being respectively arranged on either side of the optical axis of the image and/or video capturing system.

4. The device according to claim 1, wherein the joint of a wing relative to the module is provided by a flexible portion inserted between the module and the wing and secured to the module and to the wing.

5. The device according to claim 1, wherein the joint of a wing relative to the module is provided by a mechanical link of the pivot or ball joint type.

6. The device according to claim 1, comprising means for fastening to at least one of the accessory and onto a user's forehead.

7. The device according to claim 6, wherein the fastening means are positioned on at least one of the lower face and on the upper face and on the rear face thereof, in the form of at least one of a hook-and-loop strip configured to cooperate with a matching hook-and-loop strip of the user's accessory and an adhesive to be attached to the accessory and directly to the user's skin.

8. The device according to claim 1, wherein the wing is in the shape of a closed shell and contains a microphone, with the shell protecting the microphone from unwanted sounds such as those created by the wind when the user moves at high speed.

9. The device according to claim 1, wherein the image and/or video capturing system comprises a steerable ball joint enabling a lens of the capturing system to rotate about at least one of a horizontal axis and about a vertical axis.

10. The device according to claim 9, further comprising: means for locking the ball joint in a particular position.

11. The device according to claim 1, further comprising: a single control button on the capturing system providing all the on, pause and off functions.

12. The device according to claim 1, further comprising: an indicator light indicating the on or off state of the capturing system, arranged on the lower face of the wing opposite the capturing system in order to be visible to the user without requiring the user to remove the device, while not excessively obstructing the user's field of view.

13. An accessory with a miniature onboard camera to be worn on a user's head, comprising a part forming a headband configured to conform to the rounded shape of the user's head, said accessory comprising the device according to claim 1 and means for fastening between the headband and the device.

14. The accessory according to claim 13, wherein the device is attached by a rear face, on the front face of the headband.

15. The accessory according to claim 14, comprising a visor integral with the headband, with the device being attached by at least one of a lower face and an upper face respectively on the upper wall or the lower wall of the visor.

* * * * *